United States Patent
Ko et al.

(10) Patent No.: US 8,299,942 B2
(45) Date of Patent: Oct. 30, 2012

(54) COMPOSITE-IMAGE PARKING-ASSISTANT SYSTEM

(75) Inventors: Ming-Kuan Ko, Lugang (TW); Hsin-Pin Yu, Lugang (TW); Tzu-Chien Hsu, Lugang (TW)

(73) Assignee: Automotive Research & Test Center, Changhua County (TW)

( * ) Notice: Subject to any disclaimer, the term of this patent is extended or adjusted under 35 U.S.C. 154(b) by 516 days.

(21) Appl. No.: 12/588,138

(22) Filed: Oct. 6, 2009

(65) Prior Publication Data
US 2010/0321211 A1    Dec. 23, 2010

(30) Foreign Application Priority Data
Jun. 23, 2009 (TW) .............................. 98121025 A

(51) Int. Cl.
*B60Q 1/48* (2006.01)
(52) U.S. Cl. .................. 340/932.2; 340/903; 340/435
(58) Field of Classification Search ........... 340/932.2, 340/901, 903, 937, 435, 436; 348/148, 149; 701/1, 36, 41; 382/104, 284
See application file for complete search history.

(56) References Cited

U.S. PATENT DOCUMENTS

| | | | | |
|---|---|---|---|---|
| 7,263,420 B2 * | 8/2007 | Tanaka et al. | ................... | 701/36 |
| 7,606,644 B2 * | 10/2009 | Kato et al. | ..................... | 701/36 |
| 7,706,944 B2 * | 4/2010 | Tanaka et al. | ................... | 701/41 |
| 8,009,869 B2 * | 8/2011 | Kumon | ......................... | 382/104 |
| 8,134,479 B2 * | 3/2012 | Suhr et al. | .................. | 340/932.2 |
| 2007/0057816 A1 * | 3/2007 | Sakakibara et al. | ........ | 340/932.2 |

* cited by examiner

*Primary Examiner* — Van T. Trieu
(74) *Attorney, Agent, or Firm* — Rosenberg, Klein & Lee

(57) ABSTRACT

The present invention discloses a composite-image parking-assistant system, which is installed in a vehicle. When a driver drives his vehicle to passes at least one parking space, the system of the present invention uses camera devices to capture images involving the parking space. A processing unit converts the images into bird's eye view images and integrates the bird's eye view images into a composite bird's eye view surrounding map via the common characteristics thereof. A display device presents the surrounding map to the driver. The processing unit adjusts the coverage the vision field of the surrounding map according the relative position of the vehicle and the parking space to make the magnification of the vision field inverse proportional to the relative position. Thereby, the driver can park his vehicle efficiently and avoid collision.

17 Claims, 14 Drawing Sheets

COMPOSITE-IMAGE PARKING-ASSISTANT SYSTEM

BACKGROUND OF THE INVENTION

1. Field of the Invention

The present invention relates to a composite-image parking-assistant system, particularly to a parking-assistant device, which integrates multiple bird's eye view images into a composite bird's eye view surrounding map and regulates the coverage of the vision field of the surrounding map according to the relative position of the vehicle and the parking space.

2. Description of the Related Art

Vehicles give modern people comfortable and fast transportation but also give modern people troublesome parking problems, especially in a crowded urban area where a parking place is usually only slightly larger than a vehicle. Therefore, a driver often uses the interior rear view mirror and the side rear view mirrors to learn the statuses of the rear, left and right sides of the vehicle.

However, a driver can only get a limited vision field from the conventional rear view mirror and is hard to always adjust the rear view mirror in driving to avoid blind spots. Thus, the driver usually has to lower the window glass and stretch out his head to detect the ambient status or slightly open the vehicle door to check whether there is a barrier in the side or the rear side of the vehicle. Sometimes, the driver may even ask the passengers to help observe the ambient status, or even the driver himself gets off the vehicle to examine the ambient status. These actions are all inconveniences for the driver.

To solve the above-mentioned problems, there was a rear view camera developed to capture the images of the parking space behind the vehicle, wherein the captured images are presented on the display inside the vehicle to help the driver reverse his vehicle into the parking space. Although the above-mentioned device can assists the driver in reversing his vehicle, the images captured by a single camera are hard to uncover all the blind spots around the vehicle. Thus, a system was proposed to overcome the above-mentioned problem, wherein a plurality of cameras replaces the single camera. The plurality of cameras captures a plurality of images around the vehicle. The images are then converted into a bird's eye view surrounding image. Although such a system can reveal most of the blind spots for the driver, the vision field of the bird's eye view surrounding image is usually too small—about only 2 meters. When the distance between the vehicle and the parking space exceeds 2 meters, the driver neither watch the whole parking space from the surrounding image presented on the display nor learns the space relationship between the vehicle and the parking space. If the driver should park his vehicle according to the surrounding image, a collision may occur.

Accordingly, the present invention proposes a composite-image parking-assistant system to overcome the conventional problems.

SUMMARY OF THE INVENTION

The primary objective of the present invention is to provide a composite-image parking-assistant system, which provides a composite bird's eye view surrounding map and adjusts the coverage of a vision field of the surrounding map according to the relative position of the vehicle and the parking space, whereby the present invention can solve the conventional problem of too small a visual field of the bird's eye view image, promote the parking efficiency and prevent from collision.

Another objective of the present invention is to provide a composite-image parking-assistant system, which provides a select frame for the driver, wherein the driver designates the intended parking space with the select frame, and the select frame will persistently appear on the display device and encircle the parking space during parking, whereby the driver can easily park his vehicle into a parking space whose boundary is not clearly delineated.

A further objective of the present invention is to provide a composite-image parking-assistant system, which provides a preset local imaging area containing several bird's eye view images, including images of a parking space, and which integrates the bird's eye view images into a surrounding map when the vehicle does not exceeds the preset local imaging area and the driver designates the parking space with a select frame, whereby is reduced the memory space occupied by the surrounding map.

To achieve the above-mentioned objectives, the present invention proposes a composite-image parking-assistant system, which is installed in a vehicle and comprises at least one camera device capturing a plurality of images of at least one parking space; a processing unit electrically connected to the camera device, converting the images into a plurality of bird's eye view images, integrating the bird's eye view images into at least one surrounding map, adjusting the coverage of a vision field of the surrounding map according to a relative position of the vehicle and the parking space to make a magnification of the surrounding map inverse proportional to the relative position; and a display device electrically connected to the processing unit and presenting the surrounding map.

The present invention can assist the driver to park in an appropriate parking space without using the rule of thumb and save the time spent in wrong decision. The present invention can provides an effective vision field for the driver and exempt the driver from blind spots or unseen barriers. Thus, the driver can park his vehicle efficiently.

Below, the embodiments will be described in detail in cooperation with the attached drawings to make easily understood the objectives, technical contents, characteristics and accomplishments of the present invention.

DETAILED DESCRIPTION OF THE INVENTION

Figure 1:
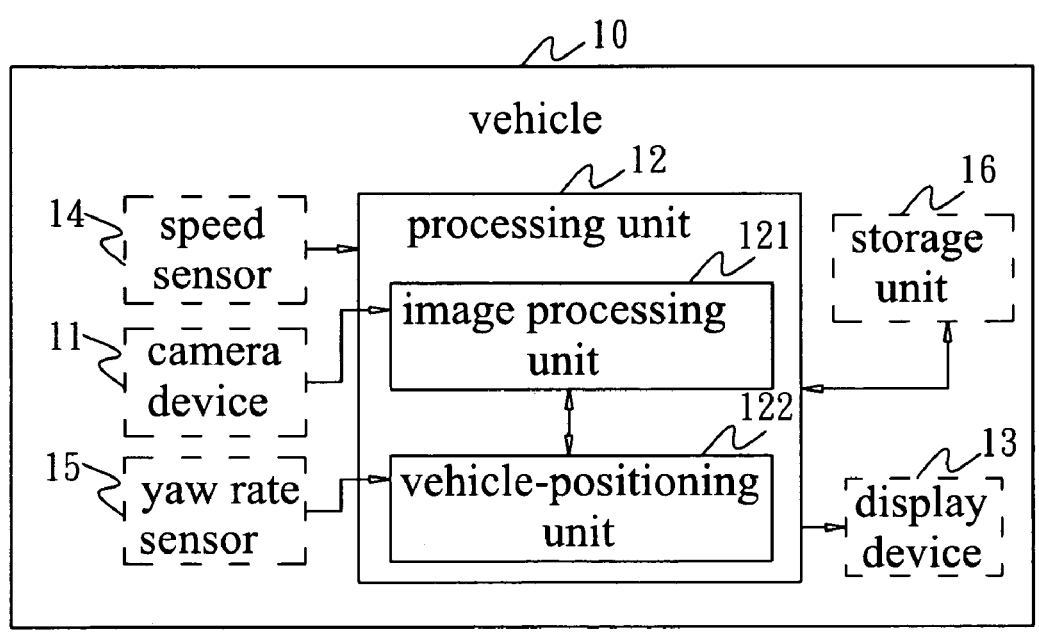
FIG. 1 is a block diagram schematically showing the architecture of a composite-image parking-assistant system according to the present invention.

Refer to FIG. 1 a block diagram schematically showing the architecture of a composite-image parking-assistant system according to the present invention. The system of the present invention is installed in a vehicle 10 and comprises at least one camera device 11, a processing unit 12, a display device 13, at least one speed sensor 14, at least one yaw rate sensor 15, and a storage unit 16. The processing unit 12 is electrically connected to the camera device 11, the display device 13, the speed sensor 14, the yaw rate sensor 15 and the storage unit 16. The processing unit 12 includes an image processing unit 121 and a vehicle-positioning unit 122.

Figure 2:
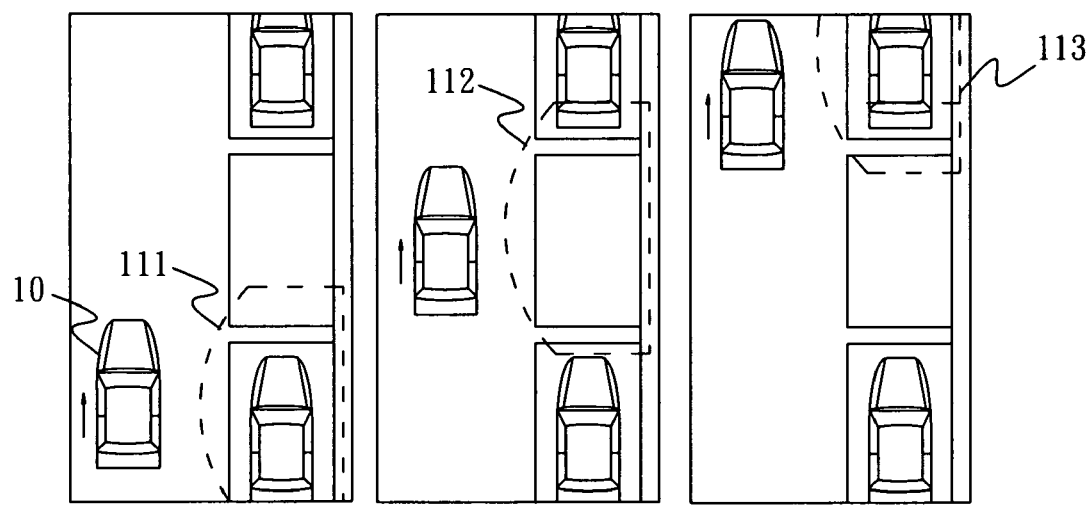
FIG. 2 is a diagram schematically showing a preset local imaging area according to the present invention.

The display device 13 is arranged inside the vehicle 10 and near the driver's seat, whereby the driver can watch the information of the vehicle 10. The camera device 11 may be a CMOS (Complementary Metal Oxide Semiconductor) element or a CCD (Charge Coupled Device) element. The camera devices 11 are arranged on the external surface of the vehicle 10 to capture the images of the front, front left, front right, rear, rear left, and rear right areas of the vehicle 10. Refer to FIG. 2 for a preset local imaging area according to one embodiment of the present invention. In the embodiment, when the driver is driving the vehicle 10 toward a parking space first time, the three images captured by the camera devices 11 are defined to be a preset local imaging area. The present invention does not limit the information quantity of the preset local imaging area. The first image captured by the camera device 11 is the image of a first parked vehicle; the second image captured by the camera device 11 is the image of the parking space; the third image capture by the camera device 11 is the image of a second parked vehicle. The image processing unit 121 transforms the images of the first parked vehicle, the parking space and the second parked vehicle into a first bird's eye view image 111 involving the first parked vehicle, a second bird's eye view image 112 involving the parking space, and a third bird's eye view image 113 involving the second parked vehicle. The image processing unit 121 stores the bird's eye view images into the storage unit 16, which may be a micro hard drive or a flash memory. Then, the image processing unit 121 integrates the three bird's eye view images into at least one surrounding map. The image processing unit 121 transforms the original images captured by the camera devices 11 into the bird's eye view images via a coordinate transformation equation (1), a perspective projection calculation equation (2) and a bird's eye view transformation equation (3).

Figure 3A:
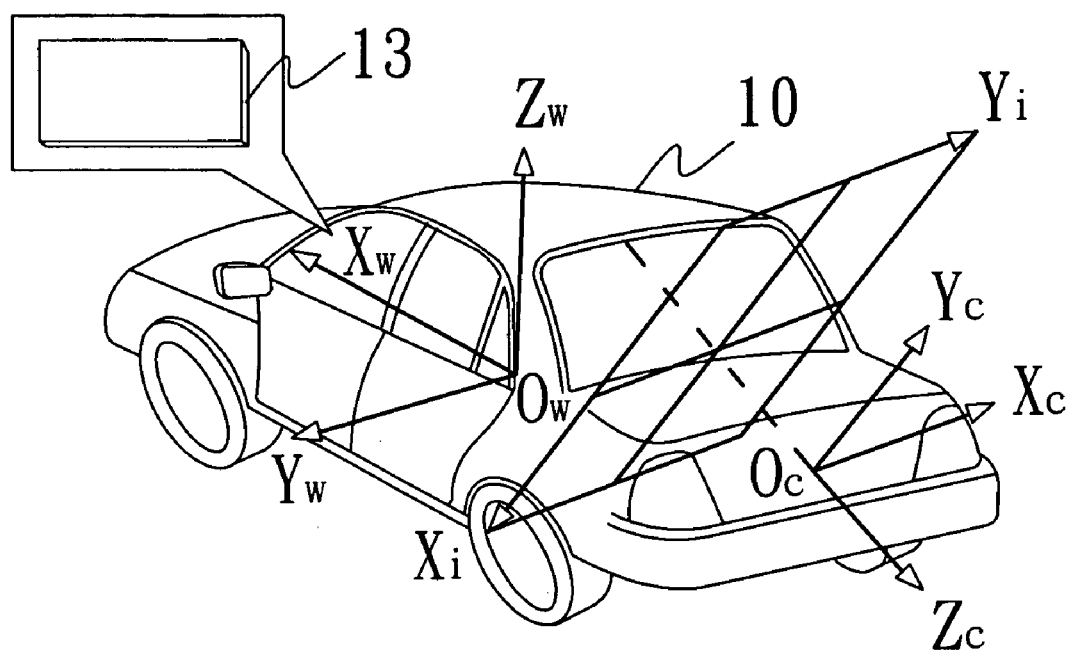
FIG. 3A is a diagram schematically showing the vector relationship in a coordinate transformation according to the present invention.

Refer to FIG. 3A for the vector relationship in a coordinate transformation according to the present invention. The image processing unit 121 firstly performs a coordinate transformation according to the coordinate transformation equation (1):

$$\begin{bmatrix} 1 \\ X_c \\ Y_c \\ Z_c \end{bmatrix} = \begin{bmatrix} 0 & 0 & 0 & 1 \\ \cos\alpha_1 & \cos\beta_1 & \cos\gamma_1 & 0 \\ \cos\alpha_2 & \cos\beta_2 & \cos\gamma_2 & 0 \\ \cos\alpha_3 & \cos\beta_3 & \cos\gamma_3 & 0 \end{bmatrix} \begin{bmatrix} 1 & 0 & 0 & -X_{oc} \\ 0 & 1 & 0 & -Y_{oc} \\ 0 & 0 & 1 & -Z_{oc} \\ 0 & 0 & 0 & 1 \end{bmatrix} \begin{bmatrix} X_w \\ Y_w \\ Z_w \\ 1 \end{bmatrix}$$

wherein $X_{oc}, Y_{oc}, Z_{oc}$ are the coordinates of the camera device 11 in the world coordinate system, and wherein $X_w, Y_w$, and $Z_w$ are respectively the X-axis, Y-axis, and Z-axis of the world coordinate system, and wherein $X_c, Y_c$, and $Z_c$ are respectively the X-axis, Y-axis, and Z-axis of the original coordinate system.

After the calculation of the coordinate transformation equation (1), the following equations are obtained:

$$X_c = a_1(X_w - X_{oc}) + a_2(Y_w - Y_{oc}) + a_3(Z_w - Z_{oc})$$

$$Y_c = b_1(X_w - X_{oc}) + b_2(Y_w - Y_{oc}) + b_3(Z_w - Z_{oc})$$

$$Z_c = c_1(X_w - X_{oc}) + c_2(Y_w - Y_{oc}) + c_3(Z_w - Z_{oc})$$

wherein $a_1 = \cos\alpha_1; a_2 = \cos\beta_1; a_3 = \cos\gamma_3$ $b_1 = \cos\alpha_1; b_2 = \cos\beta_1; b_3 = \cos\gamma_3$ $c_1 = \cos\alpha_1; c_2 = \cos\beta_1; c_3 = \cos\gamma_3$ wherein $\alpha_1, \alpha_2, \alpha_3$ are respectively the included angles between the X-axis of the coordinate system of the camera device 11 and the X-axis, Y-axis, and Z-axis of the original coordinate system;

$\beta_1, \beta_2, \beta_3$ are respectively the included angles between the Y-axis of the coordinate system of the camera device 11 and the X-axis, Y-axis, and Z-axis of the original coordinate system;

$\gamma_1, \gamma_2, \gamma_3$ are respectively the included angles between the Z-axis of the coordinate system of the camera device 11 and the X-axis, Y-axis, and Z-axis of the original coordinate system.

Figure 3B:
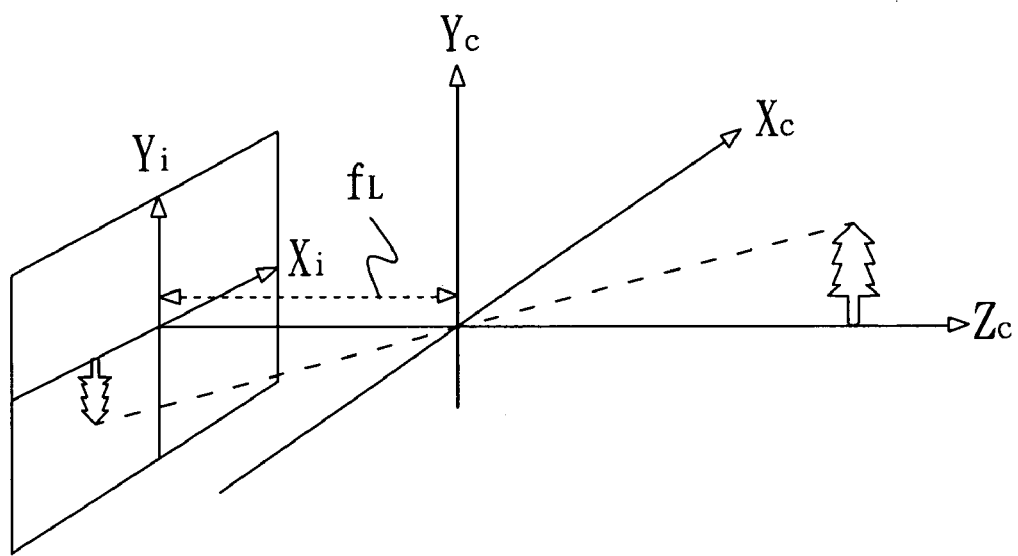
FIG. 3B is a diagram schematically showing that the original image is converted into a perspective projection image according to the present invention.

Refer to FIG. 3B a diagram schematically showing that the original image is converted into a perspective projection image. Next, the image processing unit 121 performs a vision transformation according to the perspective projection calculation equation (2):

$$X_i = -f_L \frac{a_1(X_w - X_{oc}) + a_2(Y_w - Y_{oc}) + a_3(Z_w - Z_{oc})}{c_1(X_w - X_{oc}) + c_2(Y_w - Y_{oc}) + c_3(Z_w - Z_{oc})} = -f_L \frac{X_c}{Z_c}$$

$$Y_i = -f_L \frac{b_1(X_w - X_{oc}) + b_2(Y_w - Y_{oc}) + b_3(Z_w - Z_{oc})}{c_1(X_w - X_{oc}) + c_2(Y_w - Y_{oc}) + c_3(Z_w - Z_{oc})} = -f_L \frac{Y_c}{Z_c}$$

wherein $f_L$ is the focal parameter of the camera device 11. After the calculation of the coordinate transformation equation (1) and the perspective projection calculation equation (2), the original coordinate system of the image captured by the camera device 11 is converted into a wide-angle curved-surface image coordinate system.

Figure 3C:
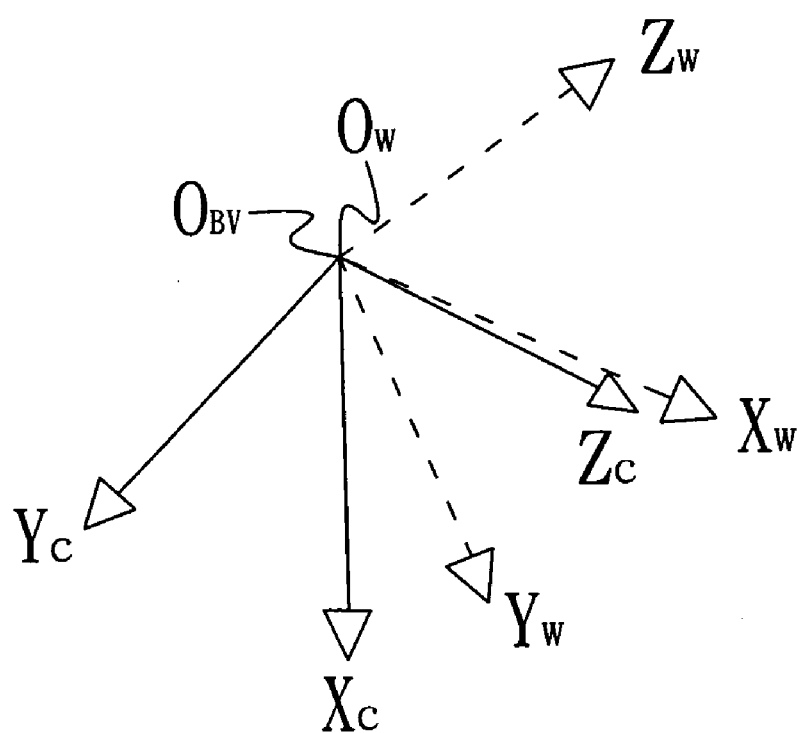
FIG. 3C is a diagram schematically showing that the perspective projection image is transformed into a bird's eye view image according to the present invention.

Refer to FIG. 3C a diagram schematically showing that the perspective projection image is transformed into a bird's eye view image. $O_w$ denotes the coordinates of the camera device 11 in the world coordinate system, and the axes thereof are represented by the dashed lines in FIG. 3C. The image processing unit 121 transforms the original image viewed from Position $O_w$ into the bird's eye view image obtained from Position $O_{BV}$ (the axes thereof represented by the solid lines) via substituting the results of the calculation of the coordinate transformation equation (1) and the perspective projection calculation equation (2) into the bird's eye view transformation equation (3):

$$\begin{bmatrix} 1 \\ X'_c \\ Y'_c \\ Z'_c \end{bmatrix} = \begin{bmatrix} 0 & 0 & 0 & 1 \\ 1 & 0 & 0 & 0 \\ 0 & \cos\alpha & 0 & 0 \\ 0 & 0 & \cos\alpha & 0 \end{bmatrix} \begin{bmatrix} 1 & 0 & 0 & -X_{BV} \\ 0 & 1 & 0 & -Y_{BV} \\ 0 & 0 & 1 & -Z_{BV} \\ 0 & 0 & 0 & 1 \end{bmatrix} \begin{bmatrix} X_w \\ Y_w \\ Z_w \\ 1 \end{bmatrix}$$

wherein α is the included angle between the bird's eye view direction and the direction of the camera device 11, and wherein $X_{BV}$, $Y_{BV}$, and $Z_{BV}$ are respectively the X-axis, Y-axis, and Z-axis of the bird's eye view image in the world coordinate system, and wherein $X_w$, $Y_w$, and $Z_w$ are respectively the X-axis, Y-axis, and Z-axis of the original image in the world coordinate system, and wherein $X'_c$, $Y'_c$, and $Z'$ are respectively the X-axis, Y-axis, and Z-axis of the original image with respective to the bird's eye view image. After the calculation of the bird's eye view transformation equation (3), the original image is transformed into the bird's eye view image.

The present invention can vary the coverage of the vision field of the bird's eye view image via modifying the three parameters $X_{BV}$, $Y_{BV}$, and $Z_{BV}$. The coverage of the vision field of the bird's eye view image varies with $Z_{BV}$ in the bird's eye view transformation equation (3). Increasing $Z_{BV}$ enlarges the coverage of the vision field of the bird's eye view image, and decreasing $Z_{BV}$ contracts the coverage of the vision field of the bird's eye view image.

Figure 4A:
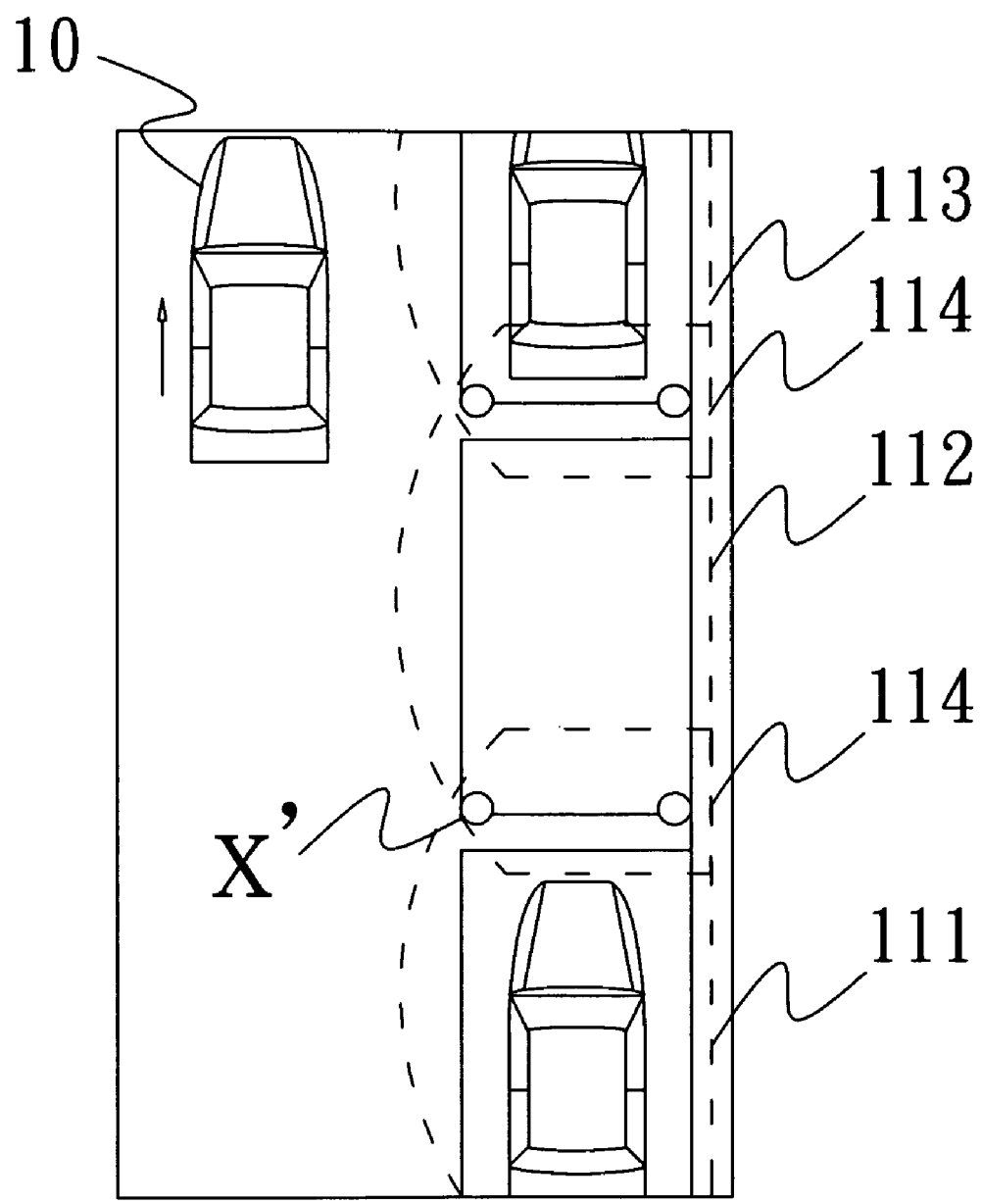
FIG. 4A is a diagram schematically showing the overlap regions of the bird's eye view images and the identical characteristics thereof according to the present invention.
Figure 4B:
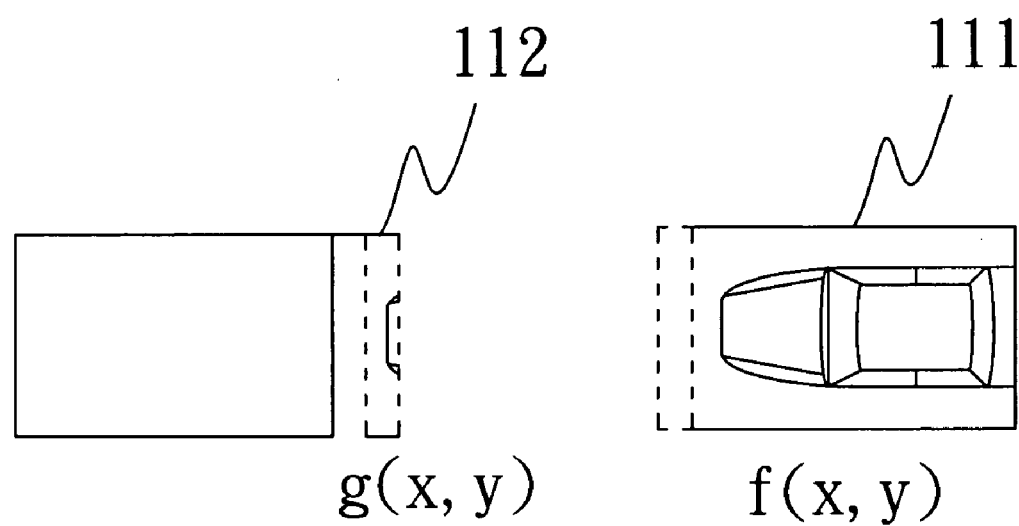
FIG. 4B is a diagram schematically showing the search of identical characteristics according to the present invention.
Figure 4C:
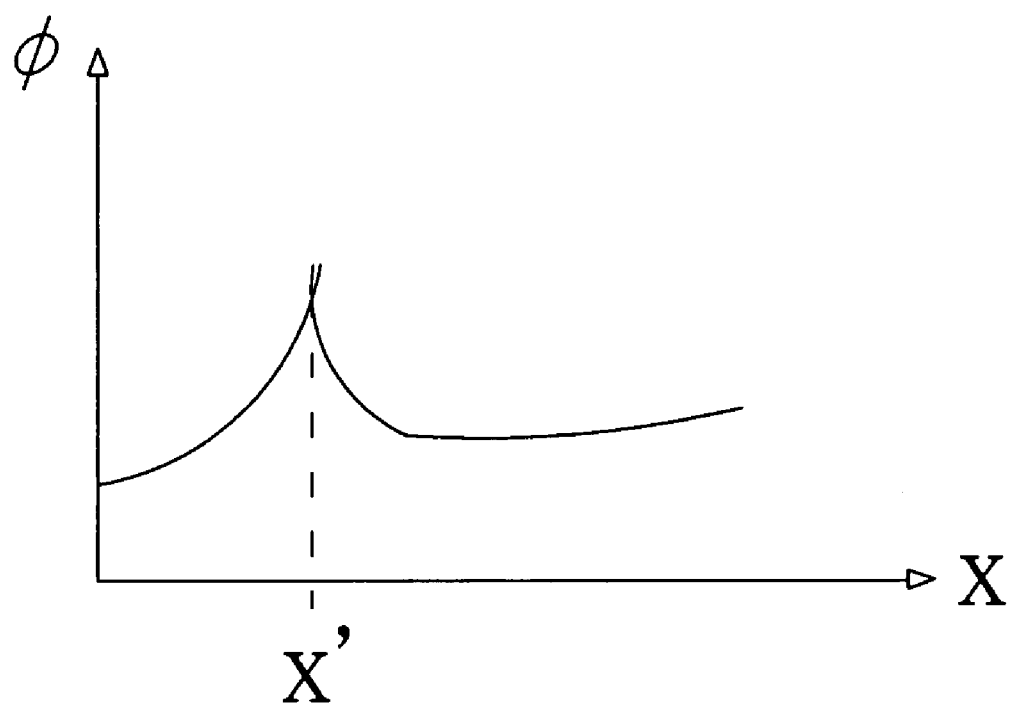
FIG. 4C is a curve showing the result of searching for identical characteristics according to the present invention.

From the above description, it is known that the image processing unit 121 can uses the above-mentioned calculations to transform the images of the first parked vehicle, the parking space and the second parked vehicle into the first bird's eye view image 111 involving the first parked vehicle, the second bird's eye view image 112 involving the parking space, and the third bird's eye view image 113 involving the second parked vehicle. Further, the image processing unit 121 searches the bird's eye view images to find out identical characteristics therefrom and uses the identical characteristics to integrate the bird's eye view images and form a surrounding map. Refer to FIGS. 4A-4C diagrams schematically showing that the present invention searches the bird's eye view images to find out identical characteristics. Firstly, the image processing unit 121 detects the overlap between the first bird's eye view image 111 involving the first parked vehicle and the second bird's eye view image 112 involving the parking space. Then, the image processing unit 121 finds out the identical characteristics of the bird's eye view images with Equation (4):

$$\phi(x, y) = g(x, y) * f(x, y)$$

$$= \sum_{m=x1}^{x2} \sum_{m=y1}^{y2} [g(m, n) \otimes f(x - m, y - n)]$$

Figure 4D:
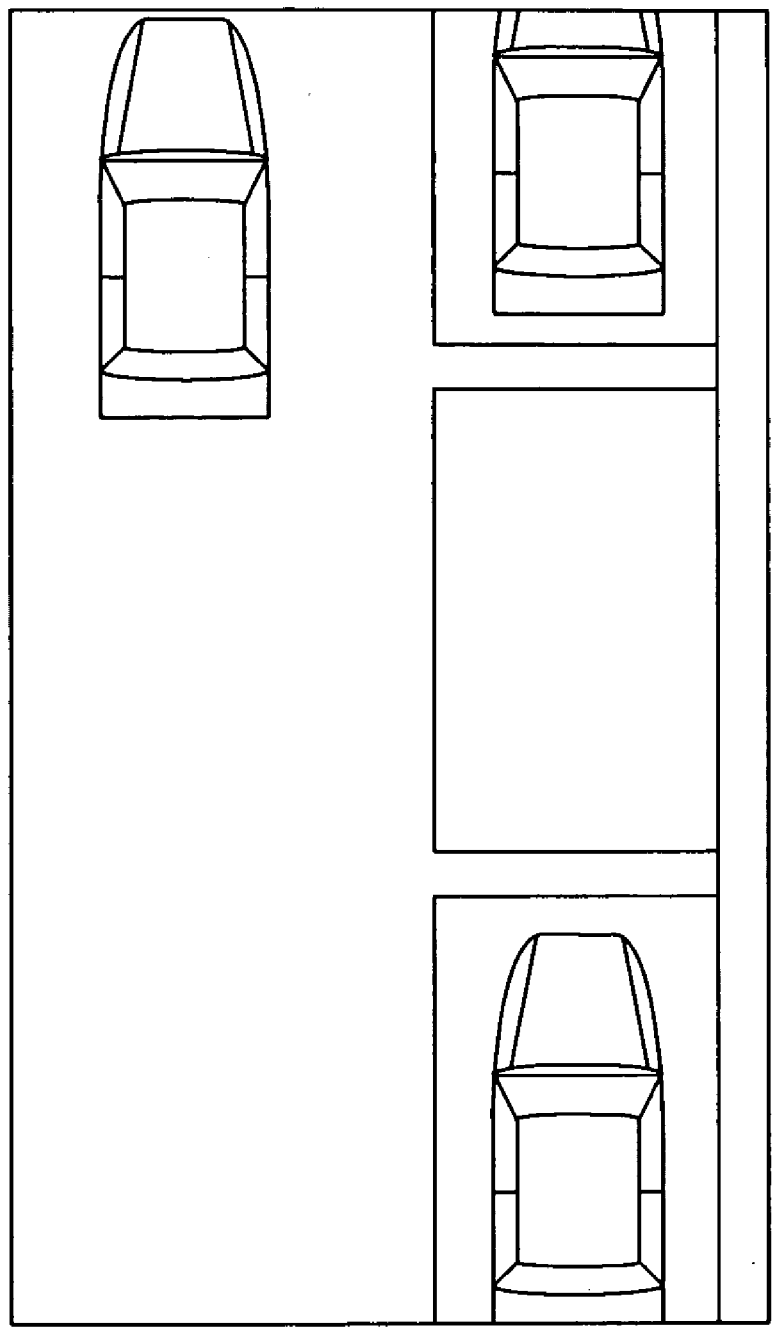
FIG. 4D is a diagram schematically showing a composite-image bird's eye view surrounding map according to the present invention.

Firstly, a portion of the second bird's eye view image 112 involving the parking space is sampled and defined to be g(x, y), and the first bird's eye view image 111 involving the first parked vehicle is defined to be f(x, y). Next, a calculation is performed on g(x, y) and f(x, y) according to Equation (4) to obtain the curve shown in FIG. 4C, wherein the horizontal axis is the X-axis of the images and the vertical axis is the φ value. The greater the φ value, the higher the similarity between the partial image and the first bird's eye view image 111 involving the first parked vehicle. Thus, the position having high similarity can be regarded as a point having an identical characteristic. In FIG. 4C, the position X' has the highest similarity between the partial image and the first bird's eye view image 111 involving the first parked vehicle. Likewise, the point having an identical characteristic can be obtained from the second bird's eye view image 112 involving the parking space and the third bird's eye view image 113 involving the second parked vehicle. Then, the image processing unit 121 integrates the points having identical characteristics of the first bird's eye view image 111 involving the first parked vehicle, the second bird's eye view image 112 involving the parking space, and the third bird's eye view image 113 involving the second parked vehicle into a composite bird's eye view surrounding map shown in FIG. 4D.

Figure 5:
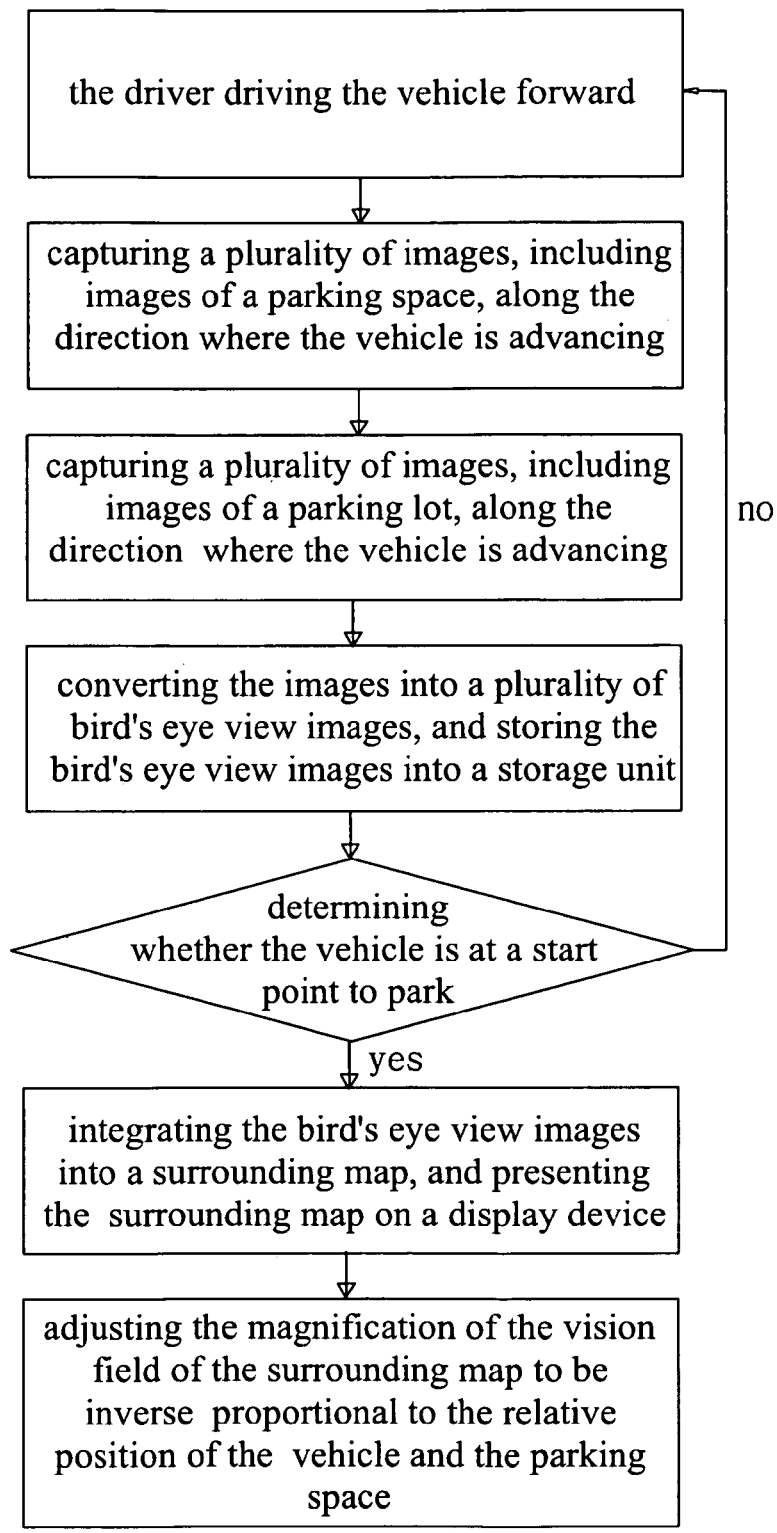
FIG. 5 is a flowchart of the operating process of a parking-assistant system according to the present invention.

Refer to FIG. 5 a flowchart of the operating process of the parking-assistant system according to the present invention. When a driver is finding an appropriate parking space, the operating process of the parking-assistant system includes the following steps:

the driver driving the vehicle 10 forward (Step S51);

capturing a plurality of images, including images of the parking space, along the direction where the vehicle 10 is advancing (Step S52);

converting the images into a plurality of bird's eye view images, and storing the bird's eye view images into a storage unit (Step S53);

determining whether the vehicle 10 is at a start point to park; if no, returning to Step S51; if yes, executing Step S55 (Step S54);

integrating the bird's eye view images into a surrounding map, and presenting the surrounding map on a display device 13 (Step S55);

adjusting the magnification of the vision field of the surrounding map to be inverse proportional to the relative position of the vehicle 10 and the parking space (Step S56).

From the above description, it is known that the present invention provides the composite bird's eye view surrounding map for the driver on the display device 13. Thereby, the driver needn't rely on the rule of thumb but can correctly determine whether the vehicle can park in a parking space. Therefore, the driver would not spend time on wrong decision but can park his car efficiently.

Figure 6:
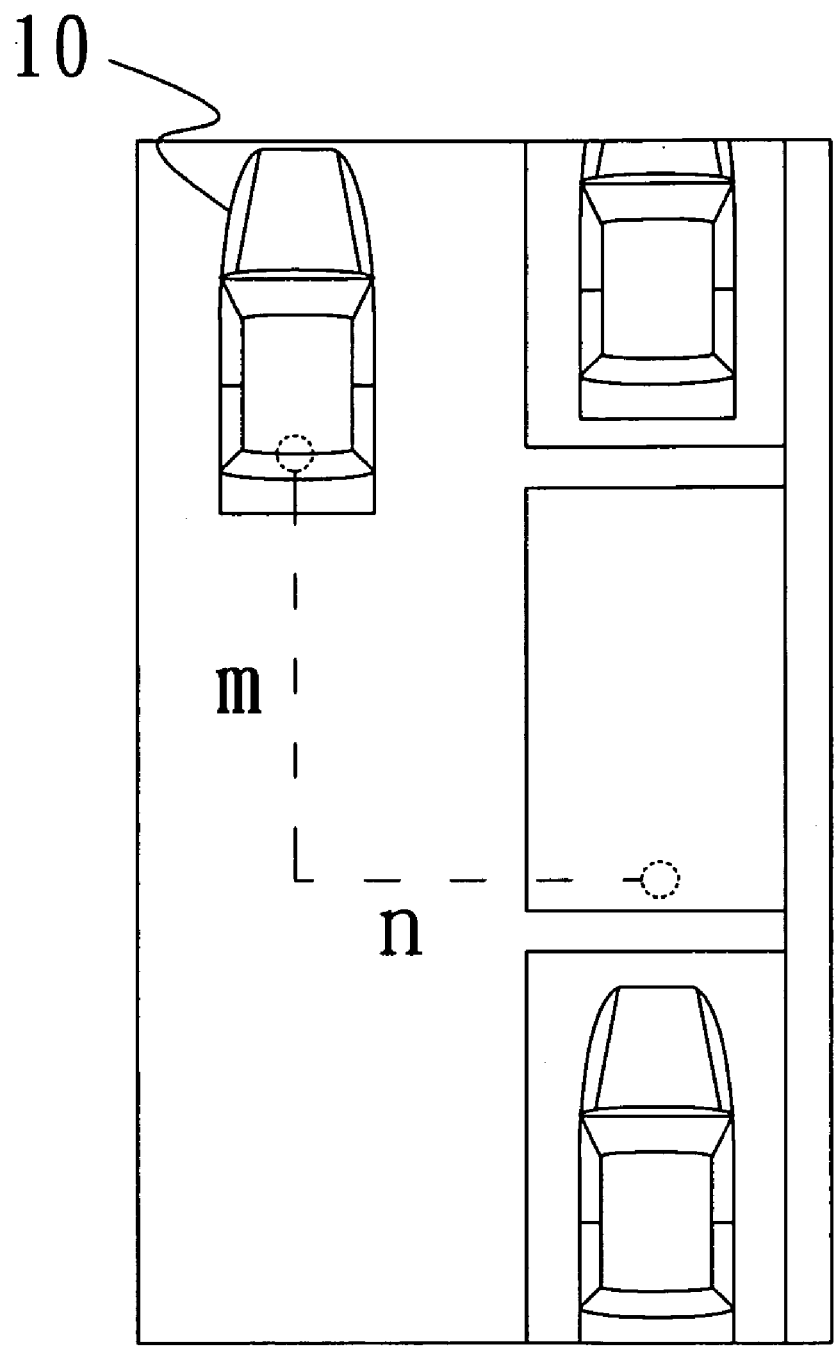
FIG. 6 is a diagram schematically showing the relative position of a vehicle and a parking space according to the present invention.

The image processing unit 121 may use the speed sensor 14 to learn the speed of the vehicle 10. The speed sensor 14 may be a wheel speed sensor or an acceleration sensor. The image processing unit 121 determines whether the vehicle 10 is inside the surrounding map according to the speed and the composite bird's eye view surrounding map. If the vehicle 10 is inside the composite bird's eye view surrounding map, the image processing unit 121 obtains a relative position of the current position of the vehicle 10 and the parking space. Then, the image processing unit 121 calculates a start point to park and obtains a longitudinal distance n and a transverse distance m between the center of the vehicle and the center of the parking space, as shown in FIG. 6.

When the driver intends to park in the parking space appearing in the surrounding map, he uses a select frame to designate the parking space. After the designation, the select frame will be persistently presented in the parking space, which conveniences the driver to park when the boundary of the parking space is not clearly delineated.

The parking space can be automatically or manual designated with the select frame. The image processing unit detects parking spaces and then automatically selects and designates a parking space with the select frame. Alternatively, the driver uses an input interface to manually select and designate a parking space with the select frame. The input interface is realized with a touch screen display device 13 or a plurality of select/control keys arranged before the driver's seat.

Figure 7:
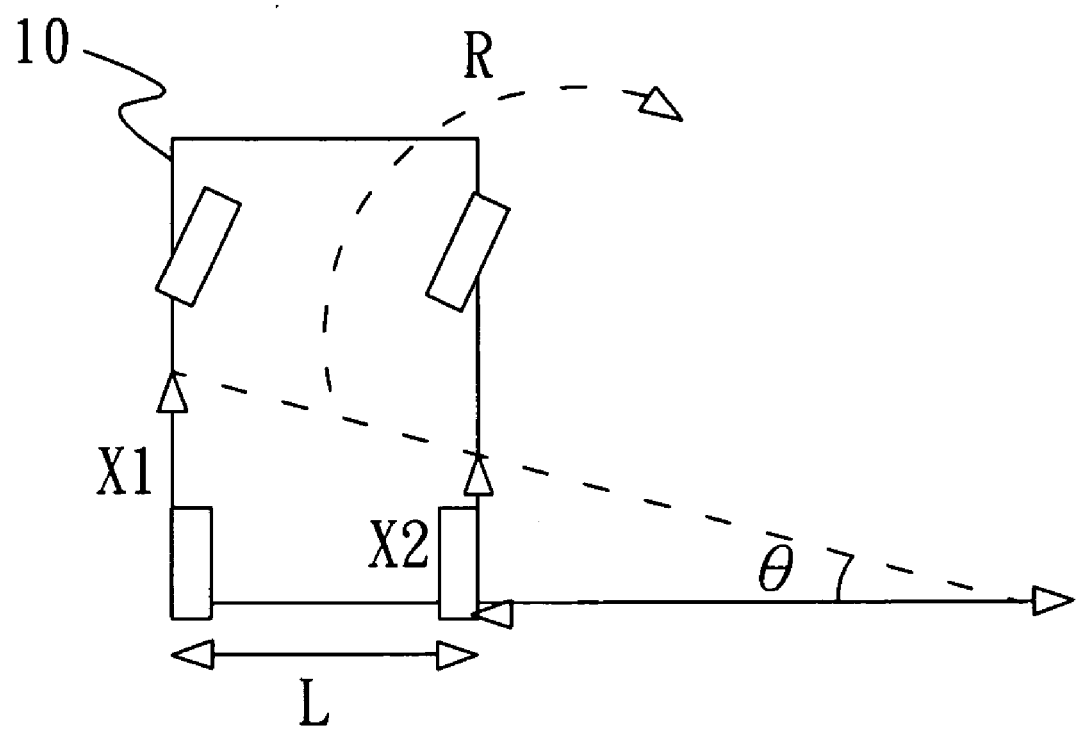
FIG. 7 is a diagram schematically showing the vectors involving the movement of a vehicle according to the present invention.

The speed sensors 14 are installed in the two rear wheels of the vehicle 10 and used in estimating the travel distances of the two rear wheels. The yaw and the track of the vehicle 10 can be worked out with the following equations:

$$X1 = (L+R)*\theta$$
$$X2 = R*\theta$$
$$X1 = L*\theta + R*\theta$$
$$X1 = L*\theta + X2$$
$$(X1 - X2)/L = d\theta$$
$$\int \frac{d(x1-x2) \cdot dt}{L} \int d\theta \cdot dt$$

wherein X1 is the travel distance of the left rear wheel of the vehicle 10, X2 the travel distance of the right rear wheel, R the turning radius of the vehicle 10, θ the turning angle of the front wheels, and L the width of the vehicle. When the turning angle is zero, X1=x2. When the turning angle is θ, the turning angle can be calculated with the travel distances of the two rear wheels. Integrating the turning angle with respect to time can obtain the track of the vehicle 10. The vehicle-positioning unit 122 can use the yaw rate sensor 15 to obtain the yaw of the vehicle 10. Refer to FIG. 7 a diagram schematically showing the vectors involving the movement of the vehicle. The track of the vehicle 10 can be more accurately calculated via using the data of the yaw rate sensor 15 and the data of the speed sensor 14 simultaneously.

The vehicle-positioning unit 122 can obtain the relative position of the vehicle 10 and the parking space according to the longitudinal distance n and transverse distance m between the center of the vehicle and the center of the parking space and the travel distance of the vehicle 10. Then, the display device 13 presents the surrounding map and the status information of the vehicle 10.

Figure 8A:
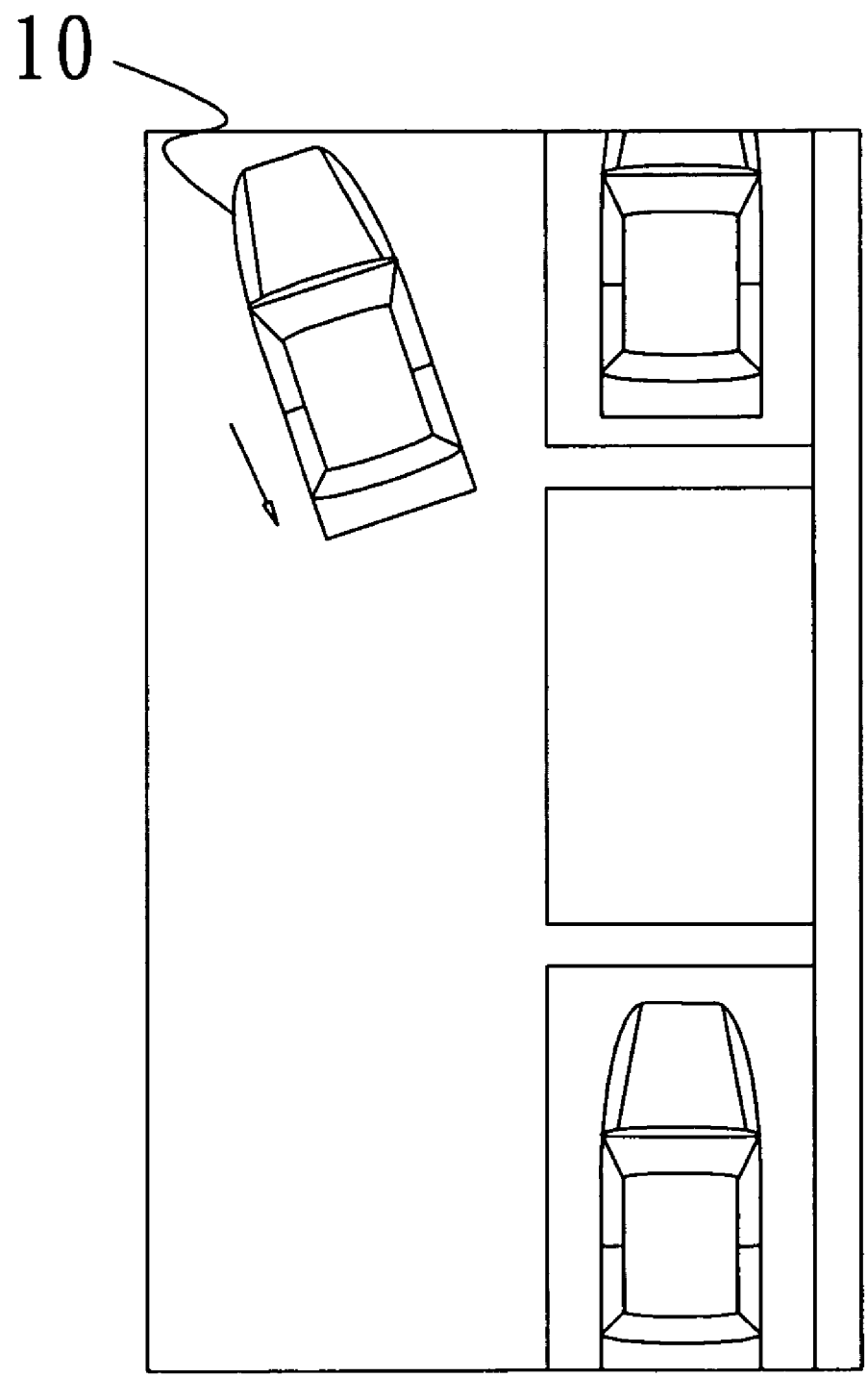
FIG. 8A is a diagram schematically showing that the vision field of a surrounding map includes the entire environment of a vehicle and a parking space according to the present invention.
Figure 8B:
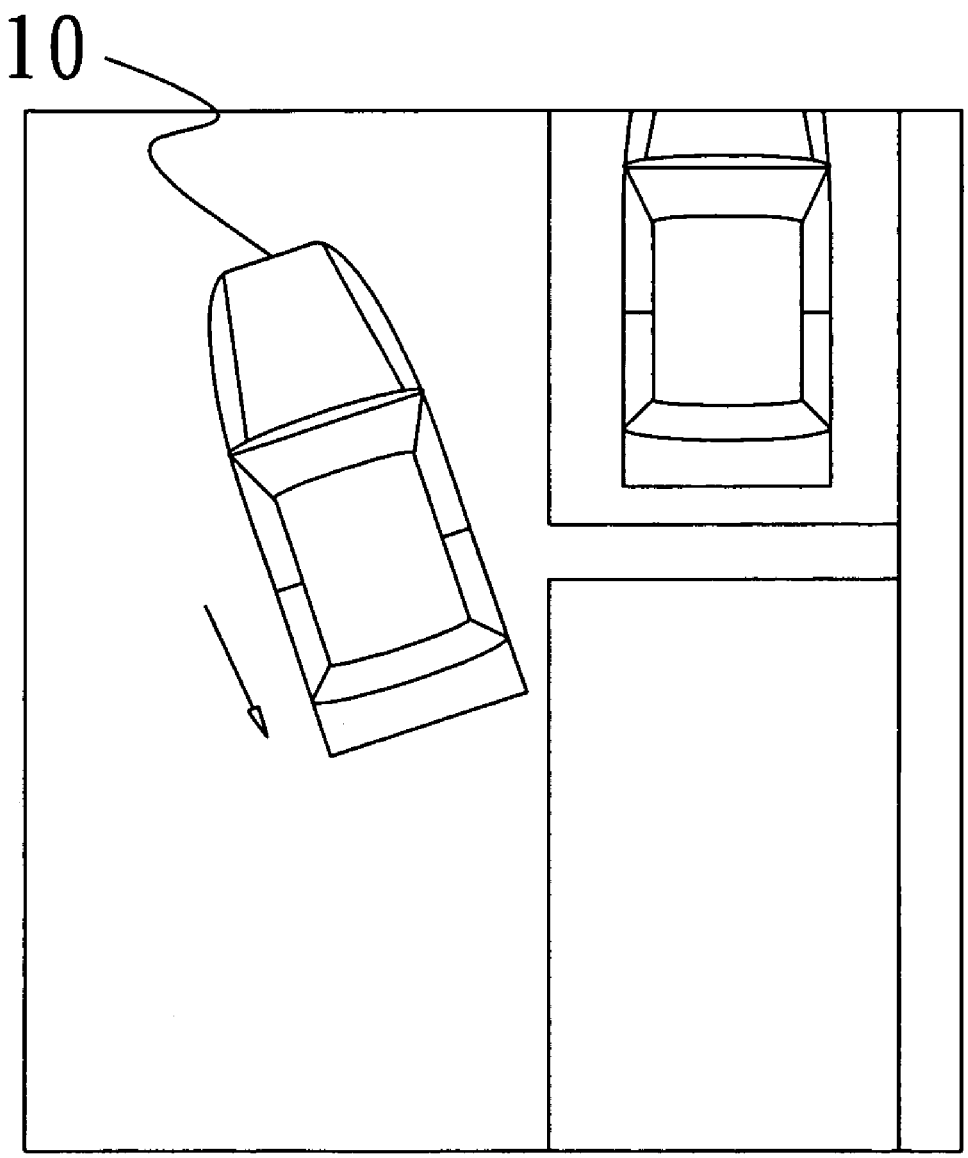
FIG. 8B is a diagram schematically showing that the vision field of a surrounding map only covers the local environment of a vehicle and a parking space according to the present invention.

The vehicle-positioning unit 122 determines the relative position of the vehicle and the parking space according to the values of m and n. When the values of m and n are greater, the magnification of the surrounding map is reduced. In other words, the value of $Z_{BV}$ in the bird's eye view transformation equation (3) is decreased to contract the coverage of the vision field and make the display device 13 present the surrounding map of the entire environment. Refer to FIG. 8A a diagram schematically showing that the vision field of the surrounding map includes the entire environment of the vehicle and the parking space. When the values of m and n are smaller, the magnification of the surrounding map is raised. In other words, the value of $Z_{BV}$ in the bird's eye view transformation equation (3) is increased to enlarge the coverage of the vision field and make the display device 13 present the surrounding map of the local environment. Refer to FIG. 8B a diagram schematically showing that the vision field of the surrounding map only covers the local environment of the vehicle and the parking space.

The vehicle-positioning unit 122 may perform positioning with an image processing method. While the vehicle 10 is to be parked inside the surrounding map, the image processing unit 121 converts the ambient images into instantaneous bird's eye view images. The vehicle-positioning unit 122 compares the instantaneous bird's eye view images with the composite bird's eye view surrounding map stored in the storage unit 16 to learn the position where the vehicle 10 exists in the surrounding map and the distance between the vehicle 10 and the parking space. The image processing unit 121 adjusts the coverage of the vision field of the surrounding map according to the relative position between the vehicle 10 and the parking space, wherein the magnification of the surrounding map is inverse proportional to the relative position. Therefore, the present invention can provides an effective vision field for the driver and exempt the driver from blind spots or unseen barriers. Thus, the driver can park his vehicle efficiently.

The embodiments described above are to exemplify the present invention to enable the persons skilled in the art to understand, make and use the present invention. However, it is not intended to limit the scope of the present invention. Any equivalent modification or variation according to the spirit of the present invention is to be also included within the scope of the present invention.

What is claimed is:

1. A composite-image parking-assistant system installed in a vehicle, comprising:
   at least one camera device capturing a plurality of images involving at least one parking space;
   a processing unit electrically connected to said camera device, converting said images into a plurality of bird's eye view images, integrating said bird's eye view images into at least one surrounding map, adjusting a coverage of a vision field of said surrounding map according to a relative position of said vehicle and said parking space to make a magnification of said surrounding map inverse proportional to said relative position, said processing unit, comprising:
      an image processing unit, said image processing unit converts said images captured by said camera device into said bird's eye view images and integrates said bird's eye view images into said surrounding map; and
      a vehicle-positioning unit, said vehicle-positioning unit adjusts said coverage of said vision field of said surrounding map according to said relative position of said vehicle and said parking space to make said magnification of said surrounding map inverse proportional to said relative position, said vehicle-positioning unit uses at least one yaw rate sensor to obtain a yaw angle of said vehicle;
   a storage unit electrically connected to said processing unit and storing said bird's eye view images; and
   a display device electrically connected to said processing unit and presenting said surrounding map;

wherein said vehicle-positioning unit calculates said yaw angle with equations:

$$X1 = (L+R)*\theta$$
$$X2 = R*\theta$$
$$X1 = L*\theta + R*\theta$$
$$X1 = L*\theta + X2$$
$$(X1-X2)/L = d\theta$$
$$\int \frac{d(x1-x2)\cdot dt}{L} \int d\theta \cdot dt$$

wherein X1 is a travel distance of a left rear wheel of said vehicle, X2 a travel distance of a right rear wheel, R a turning radius of said vehicle, θ a turning angle of front wheels of said vehicle, and L a width of said vehicle;
wherein said turning angle of said front wheels is calculated with said travel distance of said left rear wheel and said travel distance of said right rear wheel; and
wherein a track of said vehicle is calculated via integrating said turning angle of said front wheels with respect to time, and a travel distance of said vehicle is calculated from said track of said vehicle.

2. The composite-image parking-assistant system according to claim 1, wherein a select frame is used to designate said parking space; after designation, said select frame persistently encircles an area where said parking space appears on said display device.

3. The composite-image parking-assistant system according to claim 2, wherein said processing unit detects said surrounding map to find out said parking space and automatically designates said parking space with said select frame.

4. The composite-image parking-assistant system according to claim 2, wherein a driver manually designates said parking space with said select frame.

5. The composite-image parking-assistant system according to claim 4, wherein a driver manually designates said parking space via an input interface.

6. The composite-image parking-assistant system according to claim 4, wherein said display device is a touch screen; a driver manually designates said parking space via said touch screen.

7. The composite-image parking-assistant system according to claim 1, wherein said image processing unit converts said images into said bird's eye view images with a bird's eye view transformation equation:

$$\begin{bmatrix} 1 \\ X'_c \\ Y'_c \\ Z'_c \end{bmatrix} = \begin{bmatrix} 0 & 0 & 0 & 1 \\ 1 & 0 & 0 & 0 \\ 0 & \cos\alpha & 0 & 0 \\ 0 & 0 & \cos\alpha & 0 \end{bmatrix} \begin{bmatrix} 1 & 0 & 0 & -X_{BV} \\ 0 & 1 & 0 & -Y_{BV} \\ 0 & 0 & 1 & -Z_{BV} \\ 0 & 0 & 0 & 1 \end{bmatrix} \begin{bmatrix} X_w \\ Y_w \\ Z_w \\ 1 \end{bmatrix}$$

wherein α is an included angle between a bird's eye view direction and a direction of said camera device, and
wherein XBV, YBV, and ZBV are respectively an X-axis, a Y-axis, and a Z-axis of said bird's eye view images in a world coordinate system, and
wherein Xw, Yw, and Zw are respectively an X-axis, a Y-axis, and a Z-axis of said images captured by said camera device in said world coordinate system, and
wherein X'c, Y'c, and Z'c are respectively an X-axis, a Y-axis, and a Z-axis of said images with respective to said bird's eye view images.

8. The composite-image parking-assistant system according to claim 7, wherein a coverage of a vision field of said bird's eye view images is varied via adjusting XBV, YBV, and ZBV.

9. The composite-image parking-assistant system according to claim 7, wherein a value of ZBV in said bird's eye view transformation equation is increased to enlarge said coverage of said vision field of said bird's eye view images; said value of ZBV is decreased to contract said coverage of said vision field of said bird's eye view images.

10. The composite-image parking-assistant system according to claim 1, wherein said image processing unit searches said bird's eye view images to find out identical characteristics.

11. The composite-image parking-assistant system according to claim 10, wherein said image processing unit searches said bird's eye view images to find out said identical characteristics with an equation:

$$\phi(x, y) = g(x, y) * f(x, y)$$
$$= \sum_{m=x1}^{x2} \sum_{m=y1}^{y2} [g(m,n) \otimes f(x-m, y-n)]$$

wherein said bird's eye view images includes a first bird's eye view image and a second bird's eye view image, and
wherein a portion of said first bird's eye view image is defined to be g(x, y), and said second bird's eye view image is defined to be f(x, y);
wherein said g(x, y) and said f(x, y) are substituted into said equation to calculate a value of φ, and
wherein said value of φ indicates a similarity between said portion of said first bird's eye view image and said second bird's eye view image, and said identical characteristics are decided according to said value of φ.

12. The composite-image parking-assistant system according to claim 10, wherein said image processing unit uses said identical characteristics to integrate said bird's eye view images and form said surrounding map.

13. The composite-image parking-assistant system according to claim 1, wherein said image processing unit defines said bird's eye view images involving said parking space to be a preset local imaging area.

14. The composite-image parking-assistant system according to claim 13, wherein said image processing unit uses at least one speed sensor to obtain a speed of said vehicle, uses said speed of said vehicle and said preset local imaging area to obtain a relative position of said vehicle and said parking space, and uses said relative position to calculate a start point for parking.

15. The composite-image parking-assistant system according to claim 14, wherein said image processing unit integrates said bird's eye view images of said preset local imaging area into said surrounding map, and said display device presents said start point for parking and said surrounding map.

16. The composite-image parking-assistant system according to claim 1, wherein said vehicle-positioning unit enlarges said coverage of said vision field of said surrounding map with increasing of said travel distance of said vehicle and said relative position of said vehicle and said parking space to enable said display device to present said surrounding map of an entire environment.

17. The composite-image parking-assistant system according to claim 1, wherein said vehicle-positioning unit contracts said coverage of said vision field of said surrounding map with decreasing of said travel distance of said vehicle and said relative position of said vehicle and said parking space to enable said display device to present said surrounding map of a local environment.

* * * * *